US 6,627,122 B1

(12) United States Patent
Tada et al.

(10) Patent No.: US 6,627,122 B1
(45) Date of Patent: Sep. 30, 2003

(54) POWDERY FLAME RETARDANT

(75) Inventors: Yuji Tada, Tokushima (JP); Tadao Yabuhara, Tokushima (JP); Shinji Nakano, Tokushima (JP); Takashi Kameshima, Tokushima (JP); Yoichi Nishioka, Tokushima (JP); Hiroyuki Takase, Tokushima (JP)

(73) Assignee: Otsuka Chemical Co., Ltd., Osaka (JP)

( * ) Notice: Subject to any disclaimer, the term of this patent is extended or adjusted under 35 U.S.C. 154(b) by 0 days.

(21) Appl. No.: 09/762,988

(22) PCT Filed: Aug. 12, 1999

(86) PCT No.: PCT/JP99/04394

§ 371 (c)(1),
(2), (4) Date: Feb. 14, 2001

(87) PCT Pub. No.: WO00/12603

PCT Pub. Date: Mar. 9, 2000

(30) Foreign Application Priority Data

Aug. 26, 1998 (JP) .............................. 10-240104

(51) Int. Cl.$^7$ ............................ C08K 5/00; C08K 5/539
(52) U.S. Cl. ....................... 252/601; 252/604; 524/116; 524/127
(58) Field of Search ................................ 252/601–611; 524/116, 127

(56) References Cited

U.S. PATENT DOCUMENTS

| 2,782,133 | A | * | 2/1957 | Vallette ................... 106/18.16 |
| 3,711,542 | A | * | 1/1973 | Hook et al. ............. 106/163.01 |
| 3,867,186 | A | * | 2/1975 | Hook et al. .................. 252/608 |
| 3,891,448 | A | * | 6/1975 | Braxton et al. ........... 106/18.16 |
| 3,891,449 | A | * | 6/1975 | Braxton et al. .......... 106/18.16 |
| 3,955,029 | A | * | 5/1976 | Garner ........................ 252/607 |
| 3,994,996 | A | * | 11/1976 | Franko-Filipasic et al. . 558/144 |
| 4,040,780 | A | * | 8/1977 | Garner ..................... 106/18.14 |
| 5,639,808 | A | * | 6/1997 | Coggio et al. ............... 428/378 |
| 5,652,285 | A | * | 7/1997 | Coggio et al. ............... 428/378 |
| 5,762,746 | A | * | 6/1998 | Hartwell et al. ............. 156/172 |
| 6,403,755 | B1 | * | 6/2002 | Stewart et al. .............. 528/287 |

FOREIGN PATENT DOCUMENTS

| DE | 34 40 915 | 5/1986 |
| DE | 40 26 883 | 2/1992 |
| DE | 41 00 192 | 7/1992 |
| EP | 0 708 141 | 4/1996 |
| EP | 0 945 478 | 9/1996 |
| JP | 58 126368 | 7/1983 |
| JP | 61-255912 | 11/1986 |
| JP | 8-225714 | 9/1996 |
| JP | 11-181429 | 7/1999 |

* cited by examiner

*Primary Examiner*—Margaret Medley
(74) *Attorney, Agent, or Firm*—Knobbe, Martens, Olson & Bear LLP

(57) ABSTRACT

A powdery flame retardant which is obtained by mixing a flame retardant which is liquid or a viscous solid at ordinary temperature with an inorganic fibrous substance to adhere or adsorb the retardant to the fibrous substance, and which comprises 5 to 70 wt. % the flame retardant and 95 to 30 wt. % the fibrous substance. The powdery flame retardant can be easily handled because it is a powder, and is obtained by a simple and industrially advantageous method. It produces a remarkable effect that the performance of the liquid or viscous flame retardant is not impaired.

11 Claims, No Drawings

POWDERY FLAME RETARDANT

FIELD OF THE INVENTION

The present invention relates to a novel powdery flame retardant.

BACKGROUND ART

Flame retardants for synthetic resins such as phosphazen compounds, phosphoric ester compounds or the like are generally liquid or intrinsically solid. Nevertheless, these flame retardants tend to be produced as a mixture in a liquid or viscous solid state due to homologues or analogues produced as a by-product in the course of production. The flame retardants show the same tendency even if they have a high purity of, e.g. 98% or above.

When the flame retardant is added to a synthetic resin and the like, a powdery substance can be more easily handled and can be more expediently supplied, as a matter of course, than a liquid or viscous solid substance. Further, a powdery substance is more advantageous in packaging or transporting.

To pulverize a liquid or viscous solid substance, a purification method such as recrystallization using an organic solvent or fractional distillation is generally carried out. However, such methods have drawbacks that not only the methods require special equipment and energy as a heat source, but also it is unavoidable to recover and re-use the organic solvent.

DISCLOSURE OF THE INVENTION

An object of the present invention is to provide a novel powdery flame retardant free from the foregoing prior art problems.

Another object of the invention is to provide a novel powdery flame retardant prepared by pulverizing a flame retardant which is liquid or a viscous solid at ordinary temperature by a simple method free from the prior art problems.

Other objects and features of the invention are apparent from the following description.

According to the invention, there is provided a powdery flame retardant prepared by mixing a flame retardant which is liquid or a viscous solid at ordinary temperature with an inorganic fibrous substance to adhere or adsorb the flame retardant to the fibrous substance, the powdery flame retardant comprising 5 to 70 wt. % of the flame retardant and 95 to 30 wt. % of the fibrous substance.

The present inventors conducted extensive research to achieve the foregoing objects and found that a powdery flame retardant is obtained by merely mixing a flame retardant which is liquid or a viscous solid at ordinary temperature with an inorganic fibrous substance to adhere or adsorb the flame retardant to the fibrous substance, namely that it is obtained by the simple process without impairing the performance of the flame retardant as the starting material.

The present invention was completed based on this novel finding.

The powdery flame retardant of the present invention comprises as effective components a flame retardant which is liquid or a viscous solid at ordinary temperature and an inorganic fibrous substance. The term "liquid at ordinary temperature" used herein refers to a liquid having a viscosity of about 0.3 mpa·s to about 10 Pa·s at 25° C. The term "a viscous solid at ordinary temperature" used herein means a solid having a viscosity of about 10 Pa·s or more at 25° C.

Conventional flame retardants can be used as the flame retardant which is liquid or a viscous solid at ordinary temperature, namely as the raw material for the powdery flame retardant of the invention.

Preferred flame retardants for use as the starting material are, for example, phosphazene compounds, phosphoric ester compounds, organic halogen compounds and the like which are useful in producing a powdery flame retardant in a favorably powdery state. The term "in a favorably powdery state" used herein means a state wherein the powder has a substantially uniform particle size, scarcely solidifies even when stored for a long term and raises no dust in use.

Phosphazene compounds and phosphoric ester compounds are especially preferred as the starting flame retardant because they are free of halogen element which generates a harmful gas or compound on exposure to a high temperature. When a flame retardant resin composition is prepared from the powdery flame retardant of the invention and a synthetic resin, the flame retardant of the invention containing at least one of these starting flame retardants and an inorganic fibrous substance can attain a V-0 level flame retardancy in a test according to the method of flame retardancy test UL-94 (Test for Flammability of Plastic Materials for Parts in Devices and Appliances UL-94, Fourth Edition) without addition of a dripping inhibitor (inhibitor for preventing dripping of flaming particles) such as polytetrafluoroethylene or the like. Consequently the flame retardant of the invention is significantly suitable as a powdery flame retardant for a completely halogen-free flame retardant resin composition.

Phosphazene compounds useful as the starting flame retardant can be any of conventional compounds disclosed in patent publications, literature, etc., specifically in James E. Mark, Harry R. Allcock and Robert West, "Inorganic Polymers" (Prentice-Hall International, Inc., 1992), pp. 61–140.

Stated more specifically, the following compounds (1) to (4) can be exemplified.

(1) A cyclic phosphazene compound represented by the formula (1)

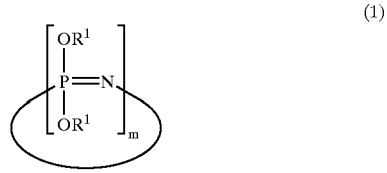

wherein m is an Integer of 3 to 25, two $R^1$ groups are the same or different and each represents a phenyl group substituted with at least one group selected from an alkyl group having 1 to 6 carbon atoms and an allyl group, or an unsubstituted phenyl group.

(2) A straight-chain phosphazene compound represented by the formula (2)

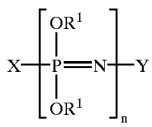

(2)

wherein n is an integer of 3 to 1,000, $R^1$ is as defined above, X represents a group $-N=P(OR^1)_3$ or a group $-N=P(O)OR^1$, and Y represents a group $-P(OR^1)_4$ or a group $-P(O)(OR^1)_2$.

(3) A crosslinked phosphazene compound wherein at least one of the foregoing phosphazene compounds (1) and (2) is crosslinked with at least one crosslinking group selected from the class consisting of o-phenylene group, m-phenylene group, p-phenylene group, biphenylene group and a group represented by the formula

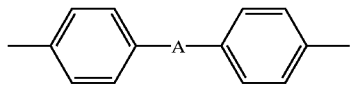

wherein A is a group $-SO_2-$, a group $-S-$, a group $-O-$ or a group $-C(CH_3)_2-$, each of said crosslinking groups being interposed between the two oxygen atoms left after the elimination of group $R^1$ from the phosphazene compound (1) or (2), and the amount of the $R^1$ groups in the crosslinked phosphazene compound being 50 to 99.9% based on the total number of $R^1$ groups in said phosphazene compound prior to crosslinking.

(4) At least one phosphazene compound selected from the group consisting of a cyclic phosphazene compound represented by the formula (3)

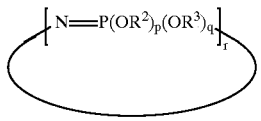

(3)

wherein $R^2$ is a cyano-substituted phenyl group; $R^3$ is an alkyl group having 1 to 18 carbon atoms or an aryl group having 6 to 10 carbon atoms; these groups may be substituted with at least one group selected from alkyl groups having 1 to 10 carbon atoms, allyl group and aryl groups; when two or more $R^3$ groups exist, the $R^3$ groups may be the same or different; p and q are numbers which fulfill the requirements that p>0, q≧0, and p+q=2; and r is an integer of 3 to 25, and a straight-chain phosphazene compound represented by the formula (4)

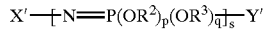

(4)

wherein $R^2$, $R^3$, p and q are as defined above; s is an integer of 3 to 1,000; X' is a group $-P(OR^2)_4$, a group $-P(OR^2)_3(OR^3)$, a group $-P(OR^2)_2(OR^3)_2$, a group $-P(OR^2)(OR^3)_3$ a group $P(OR^3)_4$, a group $-P(O)(OR^2)_2$, a group $-P(O)(OR^2)(OR^3)$, or a group $-P(O)(OR^3)_2$; and Y' is a group $-N=P(OR^2)_3$, a group $-N=P(OR^2)_2(OR^3)$, a group $-N=P(OR^2)(OR^3)_2$, a group $-N=P(OR^3)_3$, a group $-N=P(O)OR^2$ or a group $-N=P(O)OR^3$.

These phosphazene compounds can be used either alone or in combination and include a mixture of cyclic and straight-chain phosphazene compounds.

Specific examples of the cyclic phosphazene compound (1) and the straight-chain phosphazene compound (2) include a mixture of phosphazene compounds in which phenoxy groups and/or alkoxy groups are introduced as substituents and which are obtainable from a mixture of cyclic and straight-chain chlorophosphazenes, e.g., hexachlorocyclotriphosphazene,
octachlorocyclotetraphosphazene and the like, prepared by reacting ammonium chloride and phosphorus pentachloride at about 120 to about 130° C.; and
hexaphenoxycyclotriphosphazene,
octaphenoxycyclotetraphosphazene,
decaphenoxycyclopentaphosphazene,
hexaalkoxycyclotriphosphazene,
octaalkoxycyclotetraphosphazene,
decaalkoxycyclopentaphosphazene and like cyclic phosphazene compounds obtained by isolating, from the above mixture of chlorophosphazenes,
hexachlorocyclotriphosphazene,
octachlorocyclotetraphosphazene,
decachlorocyclopentaphosphazene or like simple substances, followed by substitution with a phenoxy group and/or an alkoxy group. Specific examples of the straight-chain phosphazene compound (2) include those obtained by heating (at 220 to 250° C.) hexachlorocyclotriphosphazene, for ring-opening polymerization to give dichlorophosphazene, followed by substitution with a phenoxy group and/or an alkoxy group.

Specific examples of the crosslinked phosphazene compound (3) are phenoxyphosphazene having 4,4'-sulfonyldiphenylene(bisphenol-S residue) group-crosslinked structure, phenoxyphosphazene having 2,2-(4, 4'-diphenylene)isopropylidene group-crosslinked structure, phenoxyphosphazene having 4,4'-oxydiphenylene group-crosslinked structure, phenoxyphosphazene having 4,4'-thiodiphenylene group-crosslinked structure, phenoxyphosphazene having 4,4'-diphenylene group-crosslinked structure, etc.

Specific examples of the phosphazene compound (4) are monocyanophenoxypentaphenoxycyclotriphosphazene, dicyanophenoxytetraphenoxycyclotriphosphazene, tricyanophenoxytriphenoxycyclotriphosphazene, tetracyanophenoxydiphenoxycyclotriphosphazene, pentacyanophenoxymonophenoxycyclotriphosphazene and like cyclotriphosphazene compounds; monocyanophenoxyheptaphenoxycyclotetraphosphazene, dicyanophenoxyhexaphenoxycyclotetraphosphazene, tricyanophenoxypentaphenoxycyclotetraphosphazene, tetracyanophenoxytetraphenoxycyclotetraphosphazene, pentacyanophenoxytriphenoxycyclotetraphosphazene, hexacyanophenoxydiphenoxycyclotetraphosphazene, heptacyanophenoxymonophenoxycyclotetraphosphazene and like cyclotetraphosphazene compounds; cyclopentaphosphazene compounds having both cyanophenoxy and phenoxy groups as substituents; and like cyclic phosphazene compounds; and straight-chain phosphazene compounds having both cyanophenoxy and phenoxy groups as substituents.

Among these compounds, preferred are the cyclic phosphazene compound (1) wherein m is an integer of 3 to 8, the straight-chain phosphazene compound (2) wherein n is an integer of 3 to 25, the crosslinked phosphazene compound (3) wherein A is a group —$SO_2$—, a group —S—, or a group —$C(CH_3)_2$— and the phosphazene compound (4) having both cyanophenoxy and phenoxy groups as substituents.

The purity of the phosphazene compound is variable depending on its starting materials, producing process and production conditions and is usually about 98 to about 99%. The purity of phosphazene compounds usable in the invention is not limited but is at least 90%, preferably at least 95%. Insofar as the purity of the phosphazene compound is in the above-specified range, pulverization can be performed in a simple manner and in a short time, and a powder can be obtained in a more favorable state.

Examples of the phosphoric ester compound useful as the starting flame retardant are trimethyl phosphate, triethyl phosphate, tributyl phosphate, tris(2-chloroethyl)phosphate, tris(p-tolyl)phosphate, resorcinol-bis(diphenyl phosphate), tris(dibromopropyl)phosphate, etc.

Among them, preferable are trimethyl phosphate, triethyl phosphate, tributyl phosphate, tris(p-tolyl)phosphate, resorcinol-bis(diphenyl phosphate), etc.

Among them, more preferable are tris(p-tolyl)phosphate, resorcinol-bis(diphenyl phosphate), etc.

Available as a process for preparing these organic phosphorus compounds are, for example, the processes disclosed in New Experimental Chemistry Course (Maruzen), vol. 12, pp. 421–470, John R. Van Wazer, "Phosphorus and Its Compounds", Interscienece Publishers, Inc., New York, Harry R. Allcock, et al., "Inorganic Polymers", Prentice-Hall International, Inc., pp. 61–140, Japanese Examined Patent Publication No.19003/1994, Macromolecules 1985, 18, pp.139–144, etc.

Organic halogen compounds useful as the starting flame retardant are, for example, dibromocresylglycidyl ether, chlorinated paraffin and the like.

Examples of the inorganic fibrous substance useful as the raw material for the powdery flame retardant of the invention are talc, silica, clay, barium carbonate, calcium carbonate, calcium sulfate, calcium silicate, titanium oxide, glass beads, glass ballons, glass flakes, glass fibers, fibrous alkali metal salt of titanic acid, fibrous transition metal salt of boric acid, fibrous alkaline earth metal salt of boric acid, fibrous zinc oxide, fibrous titanium oxide, fibrous magnesium oxide, fibrous gypsum, fibrous aluminum silicate (mullite by mineral name), fibrous calcium silicate (wollastonite by mineral name), fibrous silicon carbide, fibrous titanium carbide, fibrous silicon nitride, fibrous titanium nitride, carbon fiber, alumina fiber, alumina-silica fiber, zirconia fiber, quartz fiber, etc. Typical examples of fibrous alkali metal salt of titanic acid, fibrous transition metal salt of boric acid and fibrous alkaline earth metal salt of boric acid are potassium titanate fiber, aluminum borate fiber, magnesium borate fiber, etc. Among them, preferable are fibrous alkali metal salt of titanic acid, wollastonite and magnesium borate fiber, and more preferable are fibrous alkali metal salt of titanic acid and wollastonite. These inorganic fibrous substances can be used either alone or in combination and may be used in combination with inorganic additives commonly used.

The foregoing inorganic fibrous substance can be prepared according to conventional processes disclosed in patent publications, literature and the like. For example, the processes for preparing the following substances are described in parenthesized documents: fibrous zinc oxide (Japanese Examined Patent Publication No.5529/1985, Japanese Examined Patent Publication No.51657/1991, etc.), fibrous magnesium oxide (Japanese Unexamined Patent Publication No.11223/1985, Japanese Unexamined Patent Publication No.210000/1986, etc.), fibrous gypsum (Japanese Examined Patent Publication No.12235/1983, Japanese Examined Patent Publication No.34410/1983, etc.), fibrous aluminum silicate (mullite by mineral name, Japanese Examined Patent Publication No.76956/1992, Japanese Examined Patent Publication No.96480/1995, etc.), fibrous calcium silicate (wollastonite by mineral name, Japanese Unexamined Patent Publication No.319199/1996, Japanese Unexamined Patent Publication No.40840/1997, etc.), fibrous silicon carbide (Japanese Unexamined Patent Publication No.109811/1981, Japanese Examined Patent Publication No.4999/1989, etc.), fibrous titanium carbide (Japanese Examined Patent Publication No.45638/1984, Japanese Unexamined Patent Publication No.250225/1987, etc.), fibrous silicon nitride (Japanese Unexamined Patent Publication No.17499/1982, Japanese Unexamined Patent Publication No.17500/1982, etc.), and fibrous titanium nitride (Japanese Unexamined Patent Publication No.221198/1990, Japanese Unexamined Patent Publication No.173000/1995, etc.).

A preferred potassium titanate fiber is potassium hexatitanate fiber having an aspect ratio of 10 or more. Conventional potassium titanate fibers can be used without limitation if they have an aspect ratio of 10 or more. The term "aspect ratio" means a fiber length/fiber diameter. If said ratio is less than 10, sufficient flame-retardant effect can not be attained. The potassium titanate fibers can be produced by conventional methods using a potassium compound and a titanium compound as the starting materials. Usually it is suitable to use potassium titanate fibers having an average fiber diameter of about 0.05 to about 2.0 μm and an average fiber length of about 1 to about 500 μm.

Among said potassium titanate fibers, it is desirable to use those having a pH of 6.0 to 8.5. The pH of the potassium titanate fibers herein referred to is a value (as measured at 20° C.) of a pH of 1.0 wt % aqueous slurry (deionized water) of potassium titanate fibers being stirred after stirring for about 10 minutes. If the pH of potassium titanate fibers far exceeds 8.5, the resin to be rendered flame-retardant is likely to become deteriorated in properties and in heat discoloration resistance when the powdery flame retardant containing the fibers as the raw material is added to the resin. Hence it is undesirable. On the other hand, the pH of far below 6.0 not only reduces the effect of increasing the strength of a molded product of a resin composition comprising a resin and the powdery flame retardant incorporated into the resin to make the resin flame-retardant, but also erodes a processing machine and a mold due to the residual acid. Hence it is undesirable.

The powdery flame retardant of the invention can be prepared by mixing a flame retardant which is liquid or a viscous solid at ordinary temperature with an inorganic fibrous substance to adhere or adsorb the flame retardant to the fibrous substance. Usually the powdery flame retardant of the invention comprises 5 to 70 wt. % of the flame retardant which is liquid or a viscous solid at ordinary temperature and 95 to 30 wt. % of the inorganic fibrous substance, or preferably 20 to 60 wt. %, more preferably 30 to 50 wt. %, of the flame retardant which is liquid or a viscous solid at ordinary temperature and preferably 80 to 40 wt. %, more preferably 70 to 50 wt. %, of the inorganic fibrous substance. If the amount of the inorganic fibrous substance used exceeds 95 wt. %, the flame retardancy is decreased, whereas less than 30 wt. % renders the mixture viscous as a whole and readily induces agglomeration of powder, rendering the powder non-uniform and resulting in failure to achieve sufficient pulverization. Hence it is undesirable. On the other hand, more than 70 wt. % of the flame retardant which is liquid or a viscous solid at ordinary temperature makes the mixture viscous as a whole and is disadvantageous in terms of costs, whereas less than 5 wt. % lowers the flame retardancy. Hence the use of the flame retardant outside the above amount range is undesirable.

The powdery flame retardant of the invention can be prepared by mixing the flame retardant which is liquid or a viscous solid at ordinary temperature with the inorganic fibrous substance to adhere or adsorb the flame retardant to the surface of fibrous substance for pulverization. Useful mixing means include conventional instruments or machines. Examples are spade mixers, ribbon mixers, screw mixers and like mixers equipped with a stirrer. Specific methods of pulverization, for example, comprises charging the required amount of fibrous substance in a mixer equipped with a stirrer, stirring and mixing the substance, heating, when required, the flame retardant which is liquid or a viscous solid at ordinary temperature to convert it into a liquid, and adding the liquid dropwise or otherwise to pulverize the whole mixture. The rotational speed of the stirrer in the mixer is variable depending the kind of stirrer and the form thereof and is generally in the range of about 100 to about 5,000 rpm, preferably about 500 to about 1,000 rpm. When the flame retardant to be added in pulverization is a liquid of relatively low viscosity, the flame retardant can be supplied, as it is, to said mixer using a conventional liquid injector. If the flame retardant to be added has a high viscosity or is a wax-like viscous solid, the flame retardant is heated in an oven or like heater and is supplied while holding the viscosity as lowered to 0.01 to 1 Pa·s, preferably 0.05 to 0.5 Pa·s at 25° C. After completion of addition of flame retardant, the stirring and mixing are continued for 0.5 to 10 minutes, preferably 1 to 2 minutes to complete the pulverization.

The powdery flame retardant of the present invention is produced in this way. The powdery flame retardant of the invention is suitable for use in rendering various synthetic resins flame-retardant. When the flame retardant of the invention is kneaded with a resin, the flame retardant may be passed through a sieve of 4 to 16 meshes, preferably 6 to 10 meshes for attaining more uniform dispersibility so as to adjust the average particle size to about 500 $\mu$m to about 4 mm, preferably about 1 to about 3 mm. The term "knead" used herein means that when the powdery flame retardant is mixed with a resin, a shearing force is exerted on the flame retardant and the resin at the same time to uniformly disperse the flame retardant in the resin.

Examples of resins to which the powdery flame retardant of the invention can be applied are polyethylene, polypropylene, polyisoprene, polybutadiene, polystyrene, high-impact polystyrene (HIPS), acrylonitrile-styrene resin (AS resin), acrylonitrile-butadiene-styrene resin (ABS resin), methyl methacrylate-butadiene-styrene resin (MBS resin), methyl methacrylate-acrylonitrile-butadiene-styrene resin (MABS resin), acylonitrile-acrylic rubber-styrene resin (AAS resin), polyalkyl (meth)acrylate, aromatic polycarbonate (PC), polyphenylene ether (PPE), polyphenylene sulfide (PPS), polyether sulfone (PES), polysulfone (PSU), polybutylene terephthalate (PBT), polyethylene terephthalate (PET), polyethylene naphthalate (PEN), polyamide (PA), polyether ketone (PEK), polyether ether ketone (PEEK), polyamideimide (PAI), polyether imide (PEI), polyimide (PI) and like thermoplastic resins, epoxy resin and like thermosetting resins, etc.

When the powdery flame retardant of the invention is kneaded with a synthetic resin to give a flame retardant resin composition, it is suitable to use about 20 to about 60 parts by weight, preferably about 25 to about 50 parts by weight, of the powdery flame retardant per 100 parts by weight of the resin. More than 60 parts by weight of the powdery flame retardant impairs the mechanical properties of the flame retardant resin composition and results in disadvantage in terms of costs, whereas less than 20 parts by weight of the powdery flame retardant leads to insufficient flame retardancy. Hence the use of powdery flame retardant outside said amount range is undesirable.

When a flame retardant resin composition is prepared by kneading the powdery flame retardant of the invention with synthetic resins, it is possible to add a suitable combination of additives for resins in a way to select species of additives and the amount thereof none of which will adversely affect the performance of the flame retardant. These additives for resins (hereinafter referred to as "resin additives") include, for example, other flame retardants, UV absorbers, light stabilizers, antioxidants, light screens, metal deactivators, light-extinguishing agents, heat resistance stabilizers, lubricants, mold releasing agents, coloring agents, antistatic agents, antiaging agents, plasticizers, impact strength improving agents, fillers and compatibilizers, etc.

More specific examples of the resin additives are aluminum hydroxide, magnesium hydroxide, antimony trioxide, antimony pentaoxide, boric acid, barium borate, calcium borate, magnesium carbonate, zinc oxide, barium sulfate, aluminum sulfate, magnesium sulfate, ammonium polyphosphate, sodium toluenesulfonate, sodium naphthalenesulfonate, guanidine, melamine cyanurate, melamine, chitin, chitosan, liquid crystal polymer, mica, kaolin, etc. Among them, preferred are aluminum hydroxide, magnesium hydroxide, barium sulfate, aluminum sulfate, ammonium polyphosphate and liquid crystal polymer, and more preferred are aluminum hydroxide and barium sulfate. These resin additives can be used either alone or in combination. The resin additives can be added when the flame retardant of the invention is prepared.

When the foregoing resin additive is used, it is suitable to knead the resin additive in an amount of 0.01 to 30 parts by weight, preferably 0.5 to 20 parts by weight, per 100 parts by weight of the synthetic resin, with the powdery flame retardant of the invention. The use of the resin additive may further increase, for example, the flame retardancy according to the characteristics of the resin additive. If less than 0.01 part by weight of the resin additive is used, the flame retardancy or like property is not enhanced, whereas more than 30 parts by weight impairs the mechanical properties of the resin after kneading. Hence the use of the resin additive outside said amount range is unfavorable.

Moldings formed of the flame retardant resin composition containing the powdery flame retardant of the invention are excellent in mechanical properties and flame retardancy. The resin composition can be molded into moldings by, e.g. injection molding, sheet extrusion, vacuum molding, contour extrusion molding, blow molding, foam molding, injection press molding, gas injection molding and the like.

Moldings made by said molding methods, for example, find applications in various industrial fields, such as electrical, electronic or telecommunication industries, industries of agriculture, forestry, fishery, mining, construction, foods, fibers, clothings, medical services, coal, petroleum, rubber, leather, automobiles, precision machinery, timber, furniture, printing, musical instruments and the like. Stated more specifically, moldings of the flame retardant resin composition are suitable for business or office automation equipment such as printers, personal computers, word processors, keyboards, PDA (personal digital assistants), telephones, facsimile machines, copying machines, ECR (electronic cash registers), desk-top electronic calculators, electronic databooks, electronic dictionaries, cards, holders, and stationery; electrical household appliances and electrical equipment such as washing machines, refrigerators, cleaners, microwave ovens, lighting equipment, game machines, irons and kotatsu (low, covered table with a heat source underneath); audio-visual equipment such as TV, VTR, video cameras, radio cassette recorders, tape recorders, mini discs, CD players, speakers and liquid crystal displays; and electric or electronic parts and telecommunication equipment, such as connectors, relays, condensers, switches, printed circuit boards, coil bobbins, semiconductor sealing materials, electric wires, cables, transformers, deflecting yokes, distribution boards, clocks and watches. The resin composition are suitable for the following applications: articles for automobiles, vehicles, ships, aircraft and construction, such as seats (e.g., paddings, outer materials, etc.), belts, ceiling coverings, convertible tops, arm rests, door trims, rear package trays, carpets, mats, sun visors, wheel covers, mattress covers, air bags, insulation materials, hangers, hand straps, electric wire-sheathing materials, electrical insulating materials, paints, coating materials, overlaying materials, floor materials, corner walls, deck panels, covers, plywood, ceiling boards, partition plates, side walls, carpets, wall papers, wall covering materials, exterior materials, interior materials, roofing materials, sound insulating panels, thermal insulating panels and window materials; and living necessities and sporting goods, such as clothings, curtains, sheets, plywood, laminated fiber boards, carpets, entrance mats, seats, buckets, hoses, containers, glasses, bags, cases, goggles, skies, rackets, tents and musical instruments.

BEST MODE FOR CARRYING OUT THE INVENTION

The present invention will be described in more detail with reference to the following Synthesis Examples, Examples, Comparative Examples and Test Examples in which the parts and percentages are all by weight unless otherwise specified.

SYNTHESIS EXAMPLE 1

(Synthesis of phenoxyphosphazene serving as the starting flame retardant (Compound 1))

A 1-liter 4-necked flask equipped with a stirrer, a thermometer and a reflux condenser was charged with 1.30 moles (123.0 g) of phenol. Then, 500 ml of tetrahydrofuran (THF) was added to uniformly dissolve the phenol in THF. At a temperature of 25° C. or lower, 7.6 g of metal sodium was added. Thereafter the mixture was heated to 61° C. over a period of 1 hour and was continuously stirred at 61 to 68° C. for 6 hours to give a sodium phenolate solution.

In parallel with the foregoing reaction, a 2-liter 4-necked flask was charged with 290 g of a 20% chlorobenzene solution containing 0.5 unit mole (58 g) of dichlorophosphazene oligomers (a mixture of 59% of trimer, 12% of tetramer, 11% of pentamer and hexamer, 3% of heptamer, and 15% of octamer and higher oligomers). The above-obtained sodium phenolate solution was added dropwise to the contents of the flask with stirring at 25° C. or lower. After dropwise addition, the mixture was stirred at 71 to 73° C. for 15 hours for reaction.

After completion of the reaction, the reaction mixture was concentrated. Then, the concentrate was re-dissolved in 500 ml of chlorobenzene. Subsequently the solution was washed successively with water, with a 5% aqueous solution of sodium hydroxide three times, with 5% sulfuric acid, with a 5% aqueous solution of sodium bicarbonate and with water three times in this order. The mixture was concentrated and evaporated to dryness to give 108 g of a pale yellow wax-like product (yield 98.5%).

The obtained product had a weight average molecular weight (Mw) of 810 as determined by GPC analysis based on polystyrene standards and a melting temperature (Tm) of 103° C. as determined by TG/DTA analysis. The 5% weight loss temperature ($T_5$) and the decomposition starting temperature (Td) of the product were 330° C. and 347° C., respectively. The product had a residual chlorine content (Hy—Cl) of 0.09%. It was confirmed based on the phosphorus content and CHN elemental analysis data that the product was a compound having structural units represented by the following formula.

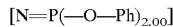   Compound 1:

wherein —Ph is a phenyl group (hereinafter the same).

SYNTHESIS EXAMPLE 2

(Synthesis of phenoxyphosphazene having 4,4'-sulfonyldiphenylene (bisphenol-S residue)-crosslinked structure (Compound 2) serving as the starting flame retardant)

A pale yellow wax-like product was prepared by conducting a reaction in the same manner as in Synthesis Example 1 using 1.25 moles (118.0 g) of phenol and 0.033 mole (8.3 g) of bisphenol S (yield 91.5%).

The obtained product had a weight average molecular weight (Mw) of 820 as determined by GPC analysis based on polystyrene standards and the 5% weight loss temperature ($T_5$) and the decomposition starting temperature (Td) of the product were 342° C. and 357° C., respectively. The product had a residual chlorine content (Hy—Cl) of ≦0.01%. It was confirmed based on the phosphorus content and CHN elemental analysis data that the product was a compound having structural units represented by the following formula.

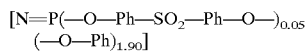   Compound 2:

wherein —Ph— is a p-phenylene group.

SYNTHESIS EXAMPLE 3

(Synthesis of resorcinol-bis(diphenyl phosphate) (Compound 3) serving as the starting flame retardant)

A 2-liter 4-necked flask was charged with 1.92 moles (234.4 g) of 2,6-xylenol, 19.2 g of xylene and 0.02 mole (1.4 g) of magnesium chloride, and the contents were heated and mixed. When the temperature of the reaction mixture reached 120° C., 1.0 mole (147.2 g) of phosphorus oxychloride was added over a period of 2 hours. The hydrochloric acid gas generated at said procedure was led to a water scrubber. After completion of addition of phosphorus oxychloride, the temperature of the reaction mixture was gradually elevated to 180° C. over a period of 2 hours to complete the reaction.

Added to the reaction mixture were 0.53 mole (52.8 g) of resorcin and 0.01 mole (1.4 g) of aluminum chloride. The mixture was mixed with heating and the reaction temperature was gradually elevated to 180° C. over a period of 2 hours. After stirring at the same temperature for 2 hours, the mixture was further stirred under a reduced pressure of 200 mmHg for 2 hours to complete the reaction. After completion of the reaction, 330 g of xylene and 33 g of 10% hydrochloric acid were added to the reaction mixture, followed by stirring and elimination of remaining catalyst and the like. Then the residue was washed with 99 g of 4% aqueous solution of sodium chloride.

Added to the obtained mixture of Compound 3 (conc. about 50%) and the solvent were 1.0 g (0.3% based on Compound 3) of 2,6-di-tert-butyl-p-cresol and 132 g of a 3% aqueous solution of sodium hydroxide. The resulting mixture was heated to 70° C., followed by stirring with heating for 1 hour. Subsequently 132 g of the oil phase of the reaction mixture was washed with a 6% saline solution at 70° C. and further with 132 g of a 4% aqueous solution of oxalic acid at 90° C. to obtain 653 g of an oil phase (about 50% conc. of Compound 3). Xylene was removed from the obtained oil phase under a reduced pressure, giving oily Compound 3. Yield 99.2%. Structural formula of

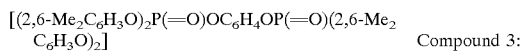

Compound 3:

EXAMPLE 1

Into an oven (130° C.) was placed 1,350 g of the viscous Compound 1 prepared in Synthesis Example 1, which was heated for 1 hour to obtain a liquid compound. Then, a supermixer (product of Kawada Seisaku Sho, trade name "SM-V-20 Model", capacity 20 liter) was charged with 1,350 g of potassium titanate fibers (product of Otsuka Chemical Co., Ltd., trade name "TISMO N-102" which may be hereinafter abbreviated to "TISMO"). With stirring at 700 rpm at room temperature, 1,350 g of preheated oil of Synthesis Example 1 was added dropwise through an inlet port in the top of the supermixer over 5 minutes. After addition, stirring was continued at room temperature at 700 rpm for 2 minutes to complete the pulverization. A white powder mixture was taken out from a lower portion of the supermixer to obtain the powdery flame retardant of the invention.

EXAMPLES 2 and 3

The powdery flame retardants of the present invention were prepared in the same manner as in Example 1 with the exception of using wollastonite (product of Otsuka Chemical Co., Ltd., trade name "BISTAL" which may be hereinafter abbreviated to "WN") or magnesium borate fibers (product of Otsuka Chemical Co., Ltd., trade name "PGM" which may be hereinafter abbreviated to "PGM") in place of potassium titanate fibers.

EXAMPLES 4 and 5

The powdery flame retardants of the present invention were prepared in the same manner as in Example 1 with the exception of using Compound 2 or Compound 3 in place of Compound 1.

COMPARATIVE EXAMPLES 1 to 5

Comparative powdery flame retardants were prepared in the same manner as in Examples 1 to 5 with the exception of using fibrous substances in an amount of 450 g.

The pulverization degree of each powdery flame retardant prepared in Examples 1 to 5 and Comparative Examples 1 to 5 was evaluated according to the following standard.

The letter A shows uniform and complete pulverization, the letter B, partial pulverization (partly remaining to be pulverized) and the letter C, incomplete pulverization.

The average particle size (mm) of each powdery J flame retardant was measured by a particle size distribution measuring device (trade name "Luzex", product of Nicole Co., Ltd.).

Table 1 shows the composition of the starting materials for the powdery flame retardants, average particle size thereof and pulverization degree thereof.

TABLE 1

|  | Starting flame retardant (part) | Fibrous substance (part) | Average particle size (mm) | Pulverization degree |
|---|---|---|---|---|
| Example 1 | Syn. Ex. 1 (50) | TISMO (50) | 1.5 | A |
| Example 2 | Syn. Ex. 1 (50) | WN (50) | 1.5 | A |
| Example 3 | Syn. Ex. 1 (50) | PGM (50) | 2.0 | A |
| Example 4 | Syn. Ex. 2 (50) | TISMO (50) | 1.2 | A |
| Example 5 | Syn. Ex. 3 (50) | TISMO (50) | 2.3 | A |
| Comp. Ex. 1 | Syn. Ex. 1 (71) | TISMO (29) | 5.5 | B |
| Comp. Ex. 2 | Syn. Ex. 2 (71) | WN (29) | 7.1 | C |
| Comp. Ex. 3 | Syn. Ex. 3 (71) | PGM (29) | 6.0 | C |
| Comp. Ex. 4 | Syn. Ex. 1 (80) | TISMO (20) | 4.9 | B |
| Comp. Ex. 5 | Syn. Ex. 2 (80) | WN (20) | 5.7 | C |

Table 1 shows that the powdery flame retardants of the invention prepared in Examples 1 to 5 have a small average particle size and are excellent in degree of pulverization compared with those prepared in Comparative Examples 1 to 5.

TEST EXAMPLES 1 to 13

The powdery flame retardants prepared in Examples 1 to 5 and Comparative Examples 1 to 5 were mixed with thermoplastic resins in the proportions shown in Table 2 below, and the mixtures were melted and kneaded using a twin-screw extruder (trade name: "S1-KRC, 25 mm Kneader", product of Kurimoto Ltd.), giving pellets. The pellets were injection-molded by an injection-molding machine (trade name "MINIMAT-26/15B" product of SUMITOMO HEAVY INDUSTRIES LTD.) to produce test pieces.

The thermoplastic resins used are as follows.

PC/ABS: product of MITSUBISHI ENGINEERING-PLASTICS CO., LTD., trade name "IUPILON S-2000"/ product of MITSUI CHEMICALS INC., trade name "SANTAC UT-61"=3/1 (weight ratio) mixture.

PC/PBT: product of MITSUBISHI ENGINEERING-PLASTICS CO., LTD., trade name "IUPILON S-2000"/ product of TORAY INDUSTRIES INC., trade name "PBT-1200S"=7/3 (weight ratio) mixture.

PPE/HIPS: product of ASAHI CHEMCAL INDUSTRY CO., LTD., trade name "XYRON X-9108".

The above-obtained test pieces were evaluated as to properties by the following methods.

1. Flexural modulus: JIS-K7203
2. Heat deformation temperature: ASTM D-648, load 18.6 kgf/cm$^2$
3. Izod impact strength (IZ): JIS-K7110, as measured at 23° C.
4. Melt flow rate (MFR): JIS-K7210, as measured at 240° C., load 10 kgf/cm$^2$
5. Flame retardancy: A flame retardancy test was conducted using a test piece measuring 1/16 inch (thickness), 5 inches (length), and 0.5 inch (width) according to the test method of UL-94 (Test for Flammability of Plastic Materials for Parts in Devices and Appliances UL-94, Fourth Edition). The results were assessed according to the following criteria.

V-0: Results which fulfil all the requirements set forth below in A–E.

A: Any of 5 test pieces (5 in one set) flamed (continuously burned in flames) for 10 seconds or shorter after contact with flame.

B: After contact with flame a total of ten times (twice each test piece), 5 test pieces (5 in one set) flamed for a total of 50 seconds or shorter.

C: None of 5 test pieces (5 in one set) flamed forward to the clamp.

D: None of 5 test pieces (5 in one set) dripped flaming particles which would ignite cotton 305 mm below.

E: Any of 5 test pieces (5 in one set) glowed (did not burn in flames but remained as a kindling charcoal) for 30 seconds or shorter after second contact with flame.

V-1: Results which fulfil all the requirements set forth below in A–E.

A: Any of 5 test pieces (5 in one set) flamed for 30 seconds or shorter after contact with flame.

B: After contact with flame a total of ten times (twice each test piece), 5 test pieces (5 in one set) flamed for a total of 250 seconds or shorter.

C and D: The same as in V-0

E: Any of 5 test pieces (5 in one set) glowed for 60 seconds or shorter after second contact with flame.

V-2: Results which fulfil all the requirements set forth below in A–E.

A, B, C and E: The same as in V-1

D: At least one of 5 test pieces (5 in one set) dripped flaming particles which would ignite cotton 305 mm below.

HB: in a horizontal burning test, none of 3 test pieces (3 in one set) burned forward to a standard line 101.6 mm away after contact with flame.

6. Degree of dripping: The dripping degree was evaluated in terms of the presence or absence of flaming particles (i.e. dripping) which would ignite cotton in the flame retardancy test.

7. Viscosity: Measured with a Brookfield type viscometer manufactured by Tokyo Keiki Co., Ltd., according to the description in New Experimental Chemistry Course (Mar. 20, 1978, third edition, Maruzen Co., Ltd.), 1-(1), pp. 170–172.

Table 2 below shows the proportions of the thermoplastic resins and the powdery flame retardants.

TABLE 2

| Test Ex. | Thermoplastic resin (part) | Powdery flame retardant (part) |
|---|---|---|
| 1 | PC/ABS (100) | Example 1 (30) |
| 2 | PC/ABS (100) | Example 2 (30) |
| 3 | PC/ABS (100) | Example 3 (30) |
| 4 | PC/ABS (100) | Example 4 (30) |
| 5 | PC/ABS (100) | Example 5 (30) |
| 6 | PC/PBT (100) | Example 2 (30) |
| 7 | PPE/HIPS (100) | Example 3 (30) |
| 8 | PPE/HIPS (100) | Example 1 (30) |
| 9 | PC/ABS (100) | Comp. Example 1 (20) |
| 10 | PC/ABS (100) | Comp. Example 2 (20) |
| 11 | PC/ABS (100) | Comp. Example 3 (20) |
| 12 | PC/PBT (100) | Comp. Example 4 (25) |
| 13 | PPE/HIPS (100) | Comp. Example 5 (25) |

Table 3 below shows the test results of test pieces in Test Examples.

TABLE 3

| Test Ex. | Flame Retardancy UL-94 | Presence or absence of dripping | Flexural modulus kgf/cm$^2$ | Heat deformation temperature (°C.) | IZ kgf · cm/cm | MFR g/10 min |
|---|---|---|---|---|---|---|
| 1 | V-0 | Absent | $2.4 \times 10^4$ | 101 | 67 | 35 |
| 2 | V-0 | Absent | $2.4 \times 10^4$ | 99 | 73 | 33 |
| 3 | V-0 | Absent | $2.4 \times 10^4$ | 120 | 78 | 60 |
| 4 | V-0 | Absent | $2.4 \times 10^4$ | 110 | 54 | 54 |
| 5 | V-0 | Absent | $2.4 \times 10^4$ | 103 | 65 | 40 |
| 6 | V-0 | Absent | $2.4 \times 10^4$ | 120 | 78 | 60 |
| 7 | V-0 | Absent | $2.3 \times 10^4$ | 98 | 61 | 41 |
| 8 | V-0 | Absent | $2.3 \times 10^4$ | 98 | 55 | 38 |
| 9 | V-2 | Present | $2.4 \times 10^4$ | 128 | 78 | 60 |
| 10 | V-2 | Present | $2.4 \times 10^4$ | 110 | 54 | 54 |
| 11 | V-2 | Present | $2.4 \times 10^4$ | 103 | 65 | 40 |
| 12 | V-2 | Present | $2.3 \times 10^4$ | 98 | 61 | 41 |
| 13 | V-2 | Present | $2.3 \times 10^4$ | 98 | 55 | 38 |

It is apparent from Table 3 that the molded products formed from the flame retardant resin compositions containing the powdery flame retardants of the invention of Examples 1 to 5 are excellent in flame retardancy compared with the molded products of the flame retardant resin compositions containing the powdery flame retardants of Comparative Examples 1 to 5.

The powdery flame retardants of the invention are prepared by mixing a flame retardant which is liquid or a viscous solid at ordinary temperature with an inorganic fibrous substance to adhere or adsorb the flame retardant to the fibrous substance whereby a powdery product is produced. The powdery flame retardant of the invention achieves remarkable effects that it can be easily handled because of being powdery and that pulverization is done in a short time without executing a specific procedure, namely it can be obtained by a simple and industrially advantageous method without impairing the performance of the flame retardant used as the raw material.

When a flame retardant resin composition is prepared from a synthetic resin and the flame retardant of the invention formed from the starting halogen-free flame retardant, the resin composition can attain a V-0 level flame retardancy in a test according to the method of flame retardancy test UL-94. Consequently the flame retardant of the invention is significantly suitable as a powdery flame retardant for a completely halogen-free flame retardant resin composition.

What is claimed is:

1. A powdery flame retardant prepared by mixing a phosphazene compound which is liquid or a viscous solid at ordinary temperature with an inorganic fibrous substance to adhere or adsorb the phosphazene compound to the fibrous substance, the powdery flame retardant comprising 30 to 50 wt. % of the phosphazene compound and 70 to 50 wt. % of the fibrous substance, and having an average particle size of about 500 $\mu$m to about 4 mm.

2. A powdery flame retardant prepared by mixing a phosphoric ester compound which is liquid or a viscous solid at ordinary temperature with an inorganic fibrous substance to adhere or adsorb the phosphoric ester compound to the fibrous substance, the powdery flame retardant comprising 5 to 70 wt. % of the phosphoric ester compound and 95 to 30 wt. % of the fibrous substance, the phosphoric ester compound being at least one of compounds selected from the group consisting of trimethyl phosphate, triethyl phosphate, tributyl phosphate, tris(p-tolyl)phosphate and resorcinol-bis(diphenyl phosphate).

3. The powdery flame retardant according to claim 1, wherein the phosphazene compound is a cyclic phosphazene compound represented by the formula

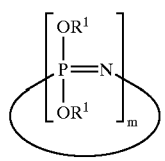

(1)

wherein m is an integer of 3 to 25, two $R^1$ groups are the same or different and each represents a phenyl group substituted with at least one group selected from an alkyl group having 1 to 6 carbon atoms and an allyl group, or an unsubstituted phenyl group.

4. The powdery flame retardant according to claim 1, wherein the phosphazene compound is a straight-chain phosphazene compound represented by the formula

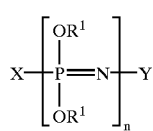

(2)

wherein n is an integer of 3 to 1,000, two $R^1$ groups are the same or different and each represents a phenyl group substituted with at least one group selected from an alkyl group having 1 to 6 carbon atoms and an allyl group, or an unsubstituted phenyl group, X represents a group —N=P$(OR^1)_3$ or a group —N=P(O)$OR^1$, and Y represents a group —P$(OR^1)_4$ or a group —P(O)$(OR^1)_2$.

5. The powdery flame retardant according to claim 1, wherein the phosphazene compound is a crosslinked phosphazene compound wherein at least one of a cyclic phosphazene compound represented by the formula

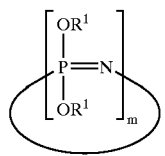

(1)

wherein m is an integer of 3 to 25, two $R^1$ groups are the same or different and each represents a phenyl group substituted with at least one group selected from an alkyl group having 1 to 6 carbon atoms and an allyl group, or an unsubstituted phenyl group, and a straight-chain phosphazene compound represented by the formula

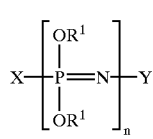

(2)

wherein n is an integer of 3 to 1,000, two $R^1$ groups are as defined above, X represents a group —N=P$(OR^1)_3$ or a group —N=P(O)$OR^1$, and Y represents a group —P$(OR^1)_4$ or a group —P(O)$(OR^1)_2$, is crosslinked with at least one crosslinking group selected from the class consisting of o-phenylene group, m-phenylene group, p-phenylene group, biphenylene group and a group represented by the formula

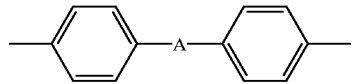

wherein A is a group —$SO_2$—, a group —S—, a group —O— or a group —C$(CH_3)_2$—.

6. The powdery flame retardant according to claim 1, wherein the phosphazene compound is at least one phosphazene compound selected from the group consisting of a cyclic phosphazene compound represented by the formula

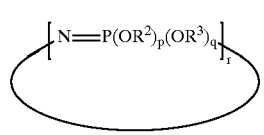

(3)

wherein $R^2$ is a cyano-substituted phenyl group; $R^3$ is an alkyl group having 1 to 18 carbon atoms or an aryl group having 6 to 10 carbon atoms; these groups may be substituted with at least one group selected from alkyl groups having 1 to 10 carbon atoms, allyl groups and aryl groups; when two or more $R^3$ groups exist, the $R^3$ groups may be the same or different; p and q are numbers which fulfil the requirements that p>0, q≧0, and p+q=2; and r is an integer of 3 to 25, and a straight-chain phosphazene compound represented by the formula

(4)

wherein $R^2$, $R^3$, p and q areas defined above; s is an integer of 3 to 1,000; X' is a group —P$(OR^2)_4$, a group —P$(OR^2)_3(OR^3)$; a group —P$(OR^2)_2(OR^3)_2$, a group —P$(OR^2)(OR^3)_3$, a group —P$(OR^3)_4$, a group —P(O)$(OR^2)_2$, a group —P(O)$(OR^2)(OR^3)$, or a group —P(O)$(OR^3)_2$; and Y' is a group —N=P$(OR^2)_3$, a group —N=P$(OR^2)_2(OR^3)$, a group —N=P$(OR^2)(OR^3)_2$, a group —N=P$(OR^3)_3$, a group —N=P(O)$OR^2$ or a group —N=P(O)$OR^3$.

7. The powdery flame retardant according to claim 2, wherein the inorganic fibrous substance is at least,one of substances selected from the group consisting of fibrous alkali metal salt of titanic acid, fibrous transition metal salt of boric acid, fibrous alkaline earth metal salt of boric acid, fibrous zinc oxide, fibrous titanium oxide, fibrous magnesium oxide, fibrous gypsum, fibrous aluminum silicate, fibrous calcium silicate, fibrous silicon carbide, fibrous titanium carbide, fibrous silicon nitride, fibrous titanium nitride, carbon fiber, alumina fiber, alumina-silica fiber, zirconia fiber, glass fiber and quartz fiber.

8. The powdery flame retardant according to claim 2, wherein the inorganic fibrous substance is at least one of substances selected from the group consisting of fibrous alkali metal salt of titanic acid, wollastonite and fibrous magnesium borate.

9. The powdery flame retardant according to claim 1, wherein the inorganic fibrous substance is at least one of substances selected from the group consisting of fibrous alkali metal salt of titanic acid, fibrous transition metal salt of boric acid, fibrous alkaline earth metal salt of boric acid, fibrous zinc oxide, fibrous titanium oxide, fibrous magnesium oxide, fibrous gypsum, fibrous aluminum silicate, fibrous calcium silicate, fibrous silicon carbide, fibrous titanium carbide, fibrous silicon nitride, fibrous titanium nitride, carbon fiber, alumina fiber, alumina-silica fiber, zirconia fiber, glass fiber and quartz fiber.

10. The powdery flame retardant according to claim 1, wherein the inorganic fibrous substance is at least one of substances selected from the group consisting of fibrous alkali metal salt of titanic acid, wollastonite and fibrous magnesium borate.

11. The powdery flame retardant according to claim 2, which has an average particle size of about 500 μm to about 4 mm.

* * * * *